Figure 1:
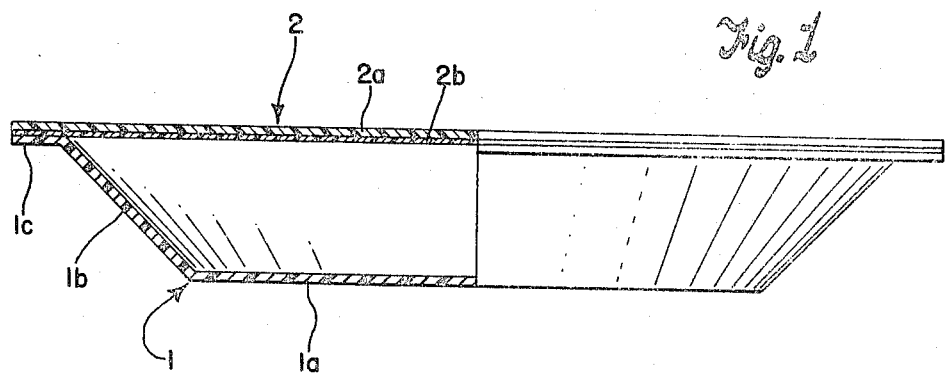

United States Patent

[11] 3,547,338

| [72] | Inventor | Pieter Hemmes |
| | | Deventer, Netherlands |
| [21] | Appl. No. | 791,215 |
| [22] | Filed | Jan. 15, 1969 |
| [45] | Patented | Dec. 15, 1970 |
| [73] | Assignee | Tedeco Verpackung G.m.b.H. |
| | | Hamburg, Germany |
| | | a corporation of Germany |
| [32] | Priority | May 6, 1968 |
| [33] | | Germany |
| [31] | | No. 1,761,336 |

[54] FOOD PACKAGE
4 Claims, 2 Drawing Figs.

[52] U.S. Cl................................................. 229/43,
229/51
[51] Int. Cl..................................................... B65d 5/54,
B65d 43/00
[50] Field of Search............................................ 161/252,
227; 154/(polyethylene digest); 229/43, 51(WB);
206/46(food); 220/53

[56] References Cited
UNITED STATES PATENTS

| 2,949,181 | 8/1960 | Buccino | (154/polyethylene digest) |
| 3,079,057 | 2/1963 | Colarusso | 229/43X |
| 3,202,271 | 8/1965 | Kirk | 229/51(SC)X |
| 3,344,974 | 10/1967 | Bostrom | 229/43 |

*Primary Examiner*—George T. Hall
*Attorneys*—Robert W. Beart, Michael Kovac, Barry L. Clark and Jack R. Halvorsen ABSTRACT: A food package including a one-piece container body made from a specific plastic material and a two-layer laminate film cover joined to a radially outwardly directed flange of the container body, the upper layer of the cover film laminate having properties similar to the material from which the container body is made while the lower layer of the film cover laminate permits bonding, but easy separation from the container body.

PATENTED DEC 15 1970

3,547,338

INVENTOR.
Pieter Hemmes
BY
His Att'ys

FOOD PACKAGE

Prepackaged frozen and chilled food for readymade meals which is capable of being heated to desired temperatures prior to serving thereof is generally packaged in a traylike container body having a protective covering film. To gain access to the contents of the package, the covering film is either cut off or torn off from the upper margin of the container thereby exposing the container contents. While the containers and/or film coverings of the prior art food packages have been made in whole or in part from paper, aluminum and/or plastic materials, the most desirable food packages are those wherein the container and film covering are hermetically sealed relative to one another, and it is this type of package to which the present invention is directed.

In container packages which are hermetically sealed to one another, there have been several approaches in facilitating the opening of the package and thus exposing the container contents. For example, the film covering has been made from a different plastic material than that from which the container is made. By appropriately selecting two such different plastic materials, an appropriate weld or bond can be obtained between the film covering and container body which is also properly hermetically sealed, and further permits easy removal of the film covering from the container body. Thus, a low film covering tear strength is provided in a film covering and container package which are hermetically sealed and bonded together.

Such prior art packages have the disadvantage, however, that the container body or covering film, in most cases the covering film, consists of a plastic material having a low softening range or melting point, and as such they are not well suited for the packaging of food substances which are to be externally heated, such as in a hot air chamber, whether it be for the purpose of sterilization or whether it be for the purpose of heating the contents of the package prior to consuming the same. It has generally been the experience with such prior art packages that the part which is formed or made from the plastic having the low temperature stability softens during heating and deforms, thus making the package potentially undesirable from a sanitary, edible and/or aesthetic viewpoint.

It is an object of the present invention to provide a food package including a container body and a covering film which is not subject to the aforementioned disadvantages.

More particularly, it is an object of the present invention to provide a hermetically sealed plastic container and covering film food package having low-film tear strength and high-temperature stability characteristics.

These and other objects and advantages of the present invention are obtained by the provision of a food package which includes a one-piece container body made from a plastic material having predetermined strength and rigidity at elevated temperatures, such as polypropylene, the container body having a bottom wall and a sidewall extending upwardly therefrom and terminating at its upper end in a radially outwardly directed flange, the food package further including a thin plastic cover film laminate having an upper layer made from a plastic material having properties similar to the container body, such as polypropylene, polyamide or polyester and a lower layer made from a plastic material which permits bonding to and easy separation from the container body, such as polyethylene, the covering film along the lower layer being bonded to the radially outwardly directed flange of the container body to provide a hermetically sealed package having a low-film cover tear strength with elevated temperature stability characteristics.

Figure 2:
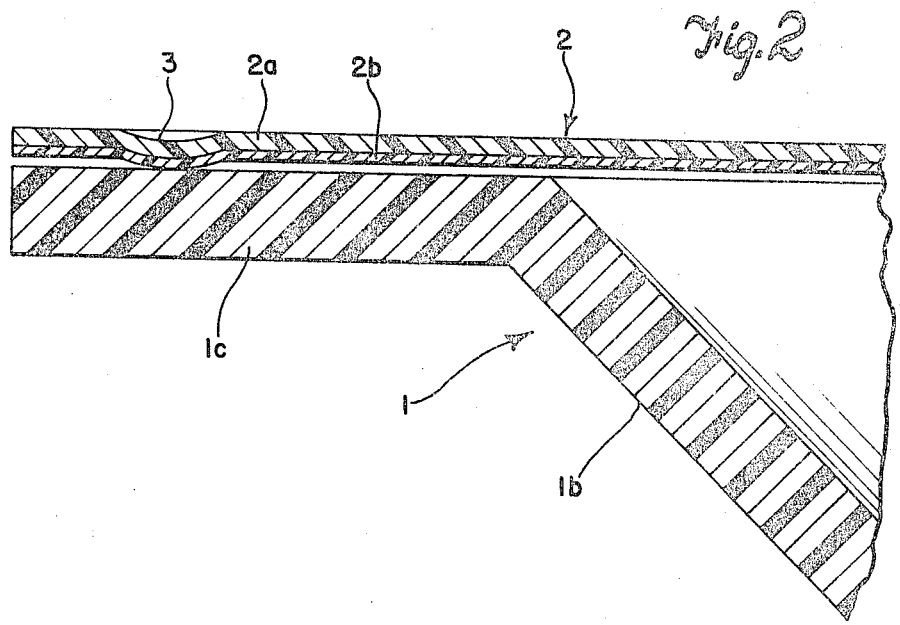

Reference is now made to the drawing wherein:

FIG. 1 is a composite side elevational and half-sectional view of a food package including a container body and covering film constructed in accordance with the teachings of the present invention; and FIG. 2 is an enlarged cross-sectional view through the margin of the food package illustrated in FIG. 1, and depicting the weld or bond between the elements of the package.

In the embodiment illustrated in the drawing, the food package includes a dishlike or traylike container 1 having a bottom wall 1a and a sidewall 1b which is circumferentially continuous and which extends upwardly (and outwardly if nesting between containers is desired) from the bottom wall 1a and terminates in a radially outwardly directed circumferentially continuous flange portion 1c at the open upper end or upper margin of the container 1. The food package further includes a covering film 2 having an upper layer 2a and a lower layer 2b, the latter being bonded to the radially outwardly directed flange 1c of the container body.

The container body 1 is thermoformed into a one-piece shape as illustrated from a plastic material having predetermined strength and rigidity at elevated temperatures. A material which can be subjected to elevated temperatures in a hot air oven is polypropylene which does not distort easily at elevated temperatures and also retains its strength and rigidity at such temperatures. The upper layer 2a of the laminated covering film 2 is also made from a plastic material having properties similar to the container body such as polypropylene, polyamide or polyester. The lower layer 2b of the laminated covering film 2 is made from a material which permits bonding to the radially outwardly directed flange 1c of the container body 1, but permits easy separation therefrom. A plastic material which has been found suitable in this regard is polyethylene.

Reference to FIG. 2 of the drawing provides an illustration of the bonding or joining of the lower polyethylene layer 2b of the laminated covering film 2 to the upper surface of the radially outwardly directed flange 1c along a depressed portion or groove 3 made in the laminated covering film 2. Obviously, if desired, the bonding or joining of the lower polyethylene layer 2b to the radially outwardly directed flange 1c can take place along the entire radial width of the flange 1c.

Due to the ready separability and bonding characteristics of the polyethylene lower layer 2b relative to the radially outwardly directed flange 1c of the container body 1, the laminated covering film 2 may be easily stripped from the container body, through the use of suitable finger tabs or the like (not shown), as a result of the low-film tear strength which is provided in the intentionally inferior weld or bond between the lower layer 2b and the flange 1c of the package. The high temperature stability characteristics of the container body 1 as well as the upper layer 2a of the laminated film covering 2, provides an overall container package which can be subjected to elevated temperatures as in a hot air oven without incurring any of the disadvantages previously mentioned.

It will be appreciated that the lower polyethylene layer 2b may be applied to the upper layer 2a by either an extrusion coating operation, or through the use of adhesives, both of which are generally known techniques. It will also be appreciated that other materials than those described which fall within the general parameters of the invention may be used in fulfilling its objectives; however, the preferred materials are those described since they have been found to work effectively in achieving the desired ends.

I claim:

1. A food package comprising a one-piece container body made from a plastic material having predetermined strength and rigidity at elevated temperatures, said container body having a bottom wall and a sidewall extending upwardly therefrom and terminating at its upper end in a radially outwardly directed flange, and a thin plastic cover film laminate including an upper layer made from a plastic material having properties similar to the container body and a lower layer made from a plastic material having properties which provides an intentionally inferior bond to the container body to permit easy separation therefrom, said covering film along the lower layer being heat sealed to the radially outwardly directed flange of the container body to provide a hermetically sealed package having a low-film cover tear strength with elevated temperature stability characteristics.

2. The food package as defined in claim 1 wherein the material of said container body is polypropylene.

3. The food package as defined in claim 2 wherein the upper layer of the plastic cover film laminate is made from polypropylene.

4. The food package as defined in claim 3 wherein the lower layer of the plastic cover film laminate is made from polyethylene.